United States Patent [19]

Harral et al.

[11] Patent Number: 4,806,940
[45] Date of Patent: Feb. 21, 1989

[54] NAVIGATION MODE SELECTION APPARATUS

[75] Inventors: Blake G. Harral, Scottsdale, Ariz.; Michael D. Reed, Marlboro, Mass.

[73] Assignee: Honeywell Inc., Minneapolis, Minn.

[21] Appl. No.: 858,410

[22] Filed: Apr. 30, 1986

[51] Int. Cl.⁴ .......................... G01S 3/02; G01C 21/00; H04B 11/16
[52] U.S. Cl. .................................... 342/451; 364/449; 455/133
[58] Field of Search ...................... 364/164, 451, 449; 342/457, 451, 410–413; 455/133–135; 340/517, 521

[56] References Cited

U.S. PATENT DOCUMENTS

| | | | |
|---|---|---|---|
| 4,071,744 | 1/1978 | Pollock | 364/164 |
| 4,459,667 | 7/1984 | Takeuchi | 342/457 |
| 4,533,991 | 8/1985 | Georgio | 364/164 |
| 4,571,685 | 2/1986 | Kamoshida | 364/164 |

OTHER PUBLICATIONS

Zimmerman, William; "Optimum Integration of Aircraft Navigation Systems"; IEEE Trans. on Aerospace and Electronics Systems; vol. AES-5, No. 5; Sep. 1969.

Primary Examiner—Theodore M. Blum
Assistant Examiner—Gregory C. Issing
Attorney, Agent, or Firm—Seymour Levine; Albin Medved; Roger W. Jensen

[57] ABSTRACT

An aircraft navigation system supporting a plurality of navigation modes. An error estimator for each navigation mode provides an estimated navmode error signal representative of an estimate of the error in the position signal generated by the associated navmode. A navigation mode selector enables the navmode having the smallest estimated navmode error signal that is consistent with procedure specified navaid criteria. The navmode computed position signal is processed through a low pass position filter. The estimated navmode error signal associated with the selected navmode is processed through a low pass position error filter having the same time constant as the low pass position filter to provide an estimated position error. The estimated position error is utilized in providing the INS and DEAD RECKONING navigation as well as to set a threshold for estimated navmode error signals sensor data validation.

5 Claims, 5 Drawing Sheets

NAVIGATION MODE SELECTION APPARATUS

BACKGROUND OF THE INVENTION

1. Field of the Invention

The invention relates to navigation systems particularly with respect to multiple mode, multiple sensor area navigation systems (RNAV) for aircraft.

2. Description of the Prior Art

Navigation systems for aircraft traditionally utilize a plurality of navigation sensors (navaids) and operate in a plurality of navigation modes (navmodes). For example, radio aids such as VOR and DME for airport-to-airport navigation and localizers for terminal guidance are utilized. The aircraft is often equipped with onside (leftside) radio receivers and offside (rightside) receivers for these radio navaids. Additionally, the navigation system aboard present day aircraft often includes an inertial navigation system (INS) or an inertial reference system (IRS).

Such navigation systems operate in a plurality of modes variously utilizing the navaid sensor complement. Such traditional modes include RHO-RHO, BEELINE, RHO-THETA LEFT, RHO-THETA RIGHT, LOCALIZER LEFT, LOCALIZER RIGHT, INS and DEAD RECKONING. In RHO-RHO and BEELINE navigation, the aircraft position is determined utilizing two DME distances where each DME sensor provides range from a known reference point. In the RHO-THETA LEFT navigation mode, the aircraft position is generated utilizing the VOR (VHF Omni Range) bearing and DME (Distance Measuring Equipment) distance from a known reference point, the bearing and distance data being provided by the leftside VOR and DME sensors. The RHO-THETA RIGHT navigation mode is similar to the RHO-THETA LEFT mode except that the bearing and distance data is provided by the rightside VOR and DME sensors. In the LOCALIZER modes lateral displacement from a localizer beam is provided by beam error data from the onside or offside localizer in accordance with the navigation mode utilized. In the INS navmode, the aircraft position is set equal to the position output of the INS. In the DEAD RECKONING mode, the aircraft position is set equal to the position determined from the DEAD RECKONING algorithm utilized.

Such multiple-mode, multiple-sensor navigation systems traditionally select the sensors and modes to be utilized in position computations in accordance with a predetermined procedure. In the prior art, a fixed hierarchy of priorities is established for navigation mode selection and sensor usage. For example, in an aircraft navigation system, having two VOR/DME sensors and one inertial navigation unit, the hierarchy of navigation modes and sensor usage might be established in the following order: RHO-RHO, RHO-THETA LEFT, RHO-THETA RIGHT, and INS.

For each navigation mode and sensor combination, a set of minimum requirements must be fulfilled before the mode is effectuated. For example, RHO-THETA LEFT navigation cannot be enabled without valid bearing and distance data from the leftside colocated VOR/DME navaid. Essentially, in prior art multiple-mode, multiple-sensor navigation systems, the navigation mode and sensor combination having the highest priority for which minimum requirements are fulfilled is selected. It was assumed in the prior art that the fixed hierarchy selection would result in the navigation mode and sensor combination providing the optimum position estimate. It was determined, however, that under commonly occuring conditions, this assumption is incorrect whereby inaccurate navaid data is utilized even though more accurate data is available. For example, the performance of the system described above, in a typical departure scenerio for a commercial airliner is considered. Immediately prior to take-off, the flight crew aligns the INS. Shortly after the aircraft becomes airborne, the leftside VOR and DME sensors receive valid radio navigation distance and bearing data from a single distant VOR/DME station. Under the fixed hierarchy described above, the RHO-THETA LEFT mode is selected as the highest priority navigation mode. This is undesirable because RHO-THETA navigation performed using a distant VOR/DME station typically results in a position computation that is less accurate than the position provided by a recently aligned INS. The INS, however, tends to drift with time. It is very accurate at the beginning of a flight, but tends to become increasingly more inaccurate as time increases. Therefore, if a long period of time has elapsed since the INS was last aligned or corrected, resulting in a degredation in the accuracy of the INS system, RHO-THETA navigation may or may not provide a more accurate position estimate at that time. Additionally, if for example, the prior art system is performing RHO-RHO navigation when criteria for RHO-RHO navigation can no longer be fulfilled, the system reverts to RHO-THETA navigation providing RHO-THETA criteria can be met. However, under these conditions, a more accurate position estimate is achievable by utilizing the radio corrected INS or DEAD RECKONING, for at least a short time, from the last RHO-RHO computed position.

These shortcomings of the prior art fixed hierarchy procedure result from the failure to make optimum usage of the navigation modes and sensors in the sense of minimizing the value of estimated position error. The fixed hierarchy procedure does not take into account that the quality of a particular navigation mode and sensor combination is not static but varies dynamically as a function of time, position and other variables. Thus, prior art navigation systems compute aircraft position utilizing inaccurate radio navaid data, even when an on-board inertial navigation system is providing a more accurate position.

SUMMARY OF THE INVENTION

The shortcomings of prior art navigation systems are overcome by the navigation system, implemented in accordance with the present invention, capable of operating in multiple navigation modes, each mode utilizing appropriate navigation sensors. The invention includes means for generating the expected or estimated navmode position error for each of the navigation modes and means for selecting the navigation mode having the smallest value of the estimated navmode error consistant with procedure specified navaid criteria. The invention further includes means for generating the aircraft position pursuant to the selected mode with a low pass, slow-in position filter processing the position data provided by the selected mode. The position filter prevents undesired instantaneous changes in aircraft position output when switching from one navigation mode to another. An identical filter is utilized to process the estimated navmode error for the selected mode to obtain an estimated position error that provides an estimate of the magnitude of the difference between the output position of the navigation system and the true aircraft position. This estimated position error is utilized to estimate the navmode errors for the INS and DEAD RECKONING navigation modes. The INS and DEAD RECKONING systems are corrected for long-term drift while still utilizing the excellent short-term performance thereof. The estimated position error is also utilized for sensor data validation in the performance of data reasonableness tests. The data reasonableness tests are performed by requiring that the difference between estimated sensor data based on assumed position calculated by the navigation system and actual sensor data which is a function of true position be below a threshhold. The threshhold is selected as a function of estimated position error thereby permitting lower threshholds to be utilized than were possible in the prior art. The invention, therefore, provides an improved ability to reject bad sensor data by utilizing more stringent data reasonableness tests.

Thus, the navigation system implemented in accordance with the present invention provides a more accurate position output than was possible in the prior art by recognizing the dynamic quality of navigation mode/sensor combinations; generating the estimated value of the mode/sensor error for each combination and implementing the navmode with the smallest value of estimated error consistant with procedures specified for the navaids.

DESCRIPTION OF THE PREFERRED EMBODIMENT

Figure 1:
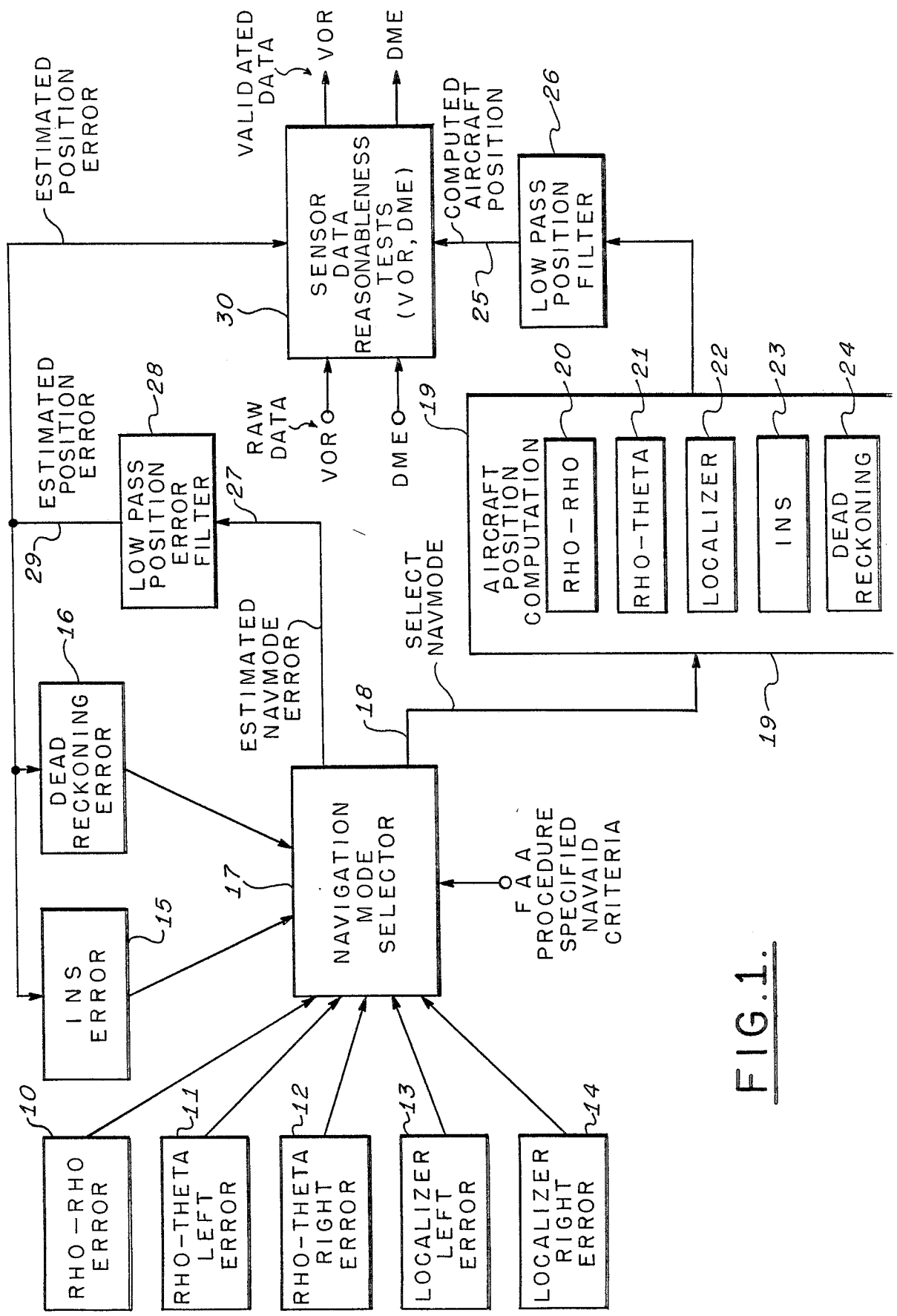
FIG. 1 is a schematic block diagram of a navigation system implementing the concepts of the present invention.

Referring to FIG. 1, a multiple-mode, multiple-sensor navigation system implementing the concepts of the present invention is illustrated. The system of FIG. 1 is capable of operating in a plurality of distinct navigation modes, each navmode utilizing appropriate navigation sensors. A plurality of navmode error estimators 10–16 provide estimated navmode position error signals associated respectively with the navmodes supported by the system. The estimated navmode error signals from the estimators 10–16 are applied to a navigation mode selector 17 which is also responsive to signals representative of FAA procedure specified navaid criteria. The navigation mode selector 17 selects the navigation mode having the lowest value of estimated navmode error that is consistant with the FAA procedure specified navaid criteria signal. The navigation mode selector 17 provides a select navmode signal on a lead 18 representative of the selected navmode. The signal on the lead 18 is applied to aircraft position computation block 19 wherein aircraft position is computed in accordance with the selected navmode. In the embodiment of the present invention, the aircraft position computation block 19 provides the following navmodes: RHO-RHO, RHO-THETA, LOCALIZER, INS, AND DEAD RECKONING as indicated by the reference numerals 20–24 respectively. It is appreciated that the signal on the lead 18 selects one of the computations 20–24 in accordance with the outputs of the error estimators 10–16 and the FAA procedure specified navaid criteria signal applied to the navigation mode selector 17. Each of the navmode computations 20–24 is responsive to appropriate sensor data and information from the navigation data base for computing the aircraft position in accordance with the selected navmode. The computed aircraft position signal is provided on a lead 25 via a low pass position filter 26. The low pass position filter 26 implements a slow-in type of function whereby abrupt changes in computed aircraft position cannot occur when switching navigation modes. Although the position filter 26 is illustrated at the output of the aircraft position computation block 19, it is appreciated that the filtering may alternatively be provided within the blocks 20–24 to the same effect.

The navigation mode selector 17 provides the estimated navmode error on a lead 27 generated by the error estimator 10–16 associated with the selected navmode. The estimated navmode error signal on the lead 27 is processed through a low-pass position error filter 28 to provide an estimated position error signal on a lead 29. The position error filter 28 has the same time constant as the position filter 26 and has a transfer function of the form $[a/(s+a)]$. The estimated position error on the lead 29 is an accurate estimate of the probable error in position at any given time. It is appreciated that there is a distinction between the estimated navmode errors and the estimated position error on the lead 29. Navmode errors are associated with a particular navigation mode and are the outputs of the error estimators 10–16. Position error is the estimate of the magnitude of the difference between the position computed by the system of FIG. 1 and the actual aircraft position.

The estimated position error on the lead 29 is utilized in the calculation of INS and DEAD RECKONING estimated navmode errors for the INS error estimator 15 and the DEAD RECKONING error estimator 16 so that the corrected INS and DEAD RECKONING navigation modes will be appropriately selected in accordance with the the invention. The estimated position error on the lead 29 is also utilized to perform sensor data validation via data reasonableness testing in a block 30 which is also responsive to the computed aircraft position on the lead 25. Data reasonableness tests are performed on the raw VOR and DME data applied as inputs to the block 30 to provide validated VOR and DME data at the outputs thereof in a manner to be explained.

Figure 2:
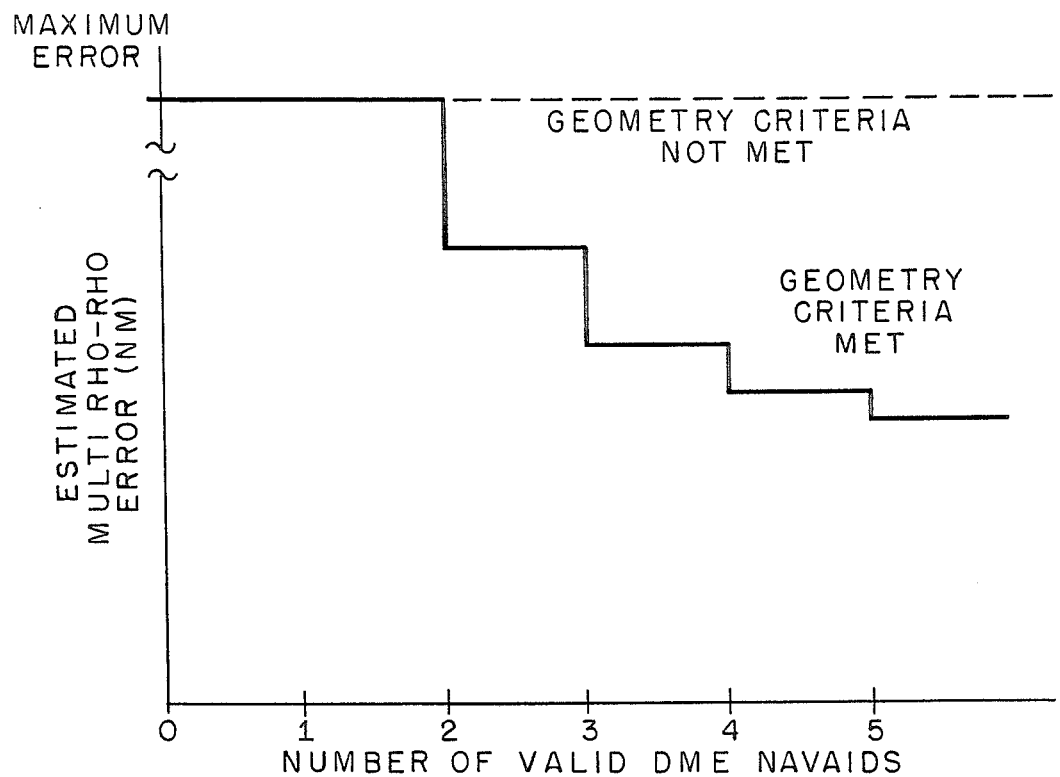
FIG. 2 is a graph of the function utilized to estimate the navmode error for the MULTIRHORHO and BEELINE navigation modes.

Referring to FIG. 2 with continued reference to FIG. 1, the error estimator 10 provides the estimated MULTIRHORHO navmode error for the MULTIRHORHO navmode. The error function for the MULTIRHORHO navmode error is illustrated in FIG. 2. The MULTIRHORHO navmode utilizes signals received from plural DME stations. Preferably ARINC 709 scanning DME equipment provides the DME information required to perform the MULTIRHORHO navigation. Errors in position computation utilizing MULTIRHORHO navigation are a function of the error models for each DME, the number of DME stations utilized and the geometry. For simplicity, the MULTIRHORHO error estimation may be performed solely as a function of the number of DME stations being utilized. If less than two usable DME stations (RHO-RHO case) are available, or geometry requirements are not met, the error estimator 10 sets the estimated navmode error to an arbitrarily large value. Otherwise, the error estimator 10 sets the estimated navmode error to 0.5 nautical miles (NM) for two usable DME stations and decreases the estimated error to 0.325 NM for five usable DME stations. A usable DME station is one that is validated by passing the data reasonableness tests of the block 30 and that meets minimum DME range criteria. A suitable range criterion is that the distance from the DME station to the aircraft is greater than 1.94 times the estimated position error on the lead 29. It is appreciated from FIG. 2 that the error function is non-linear. This nonlinearity results because each additional usable DME station provides a marginal decrease in error which is smaller than the decrease provided by the addition of the previous DME station.

BEELINE navigation may be utilized in the system of the present invention instead of MULTIRHORHO navigation. The estimated BEELINE navmode error is derived in the same manner as the estimated MULTIRHORHO navmode error except that the error is also a function an initial position estimate and the number of iterations performed. The BEELINE error estimation may also be simplified by utilizing solely a function of the number of DME stations. The error function of FIG. 2 is additionally applicable to the BEELINE navmode error.

Figure 3:
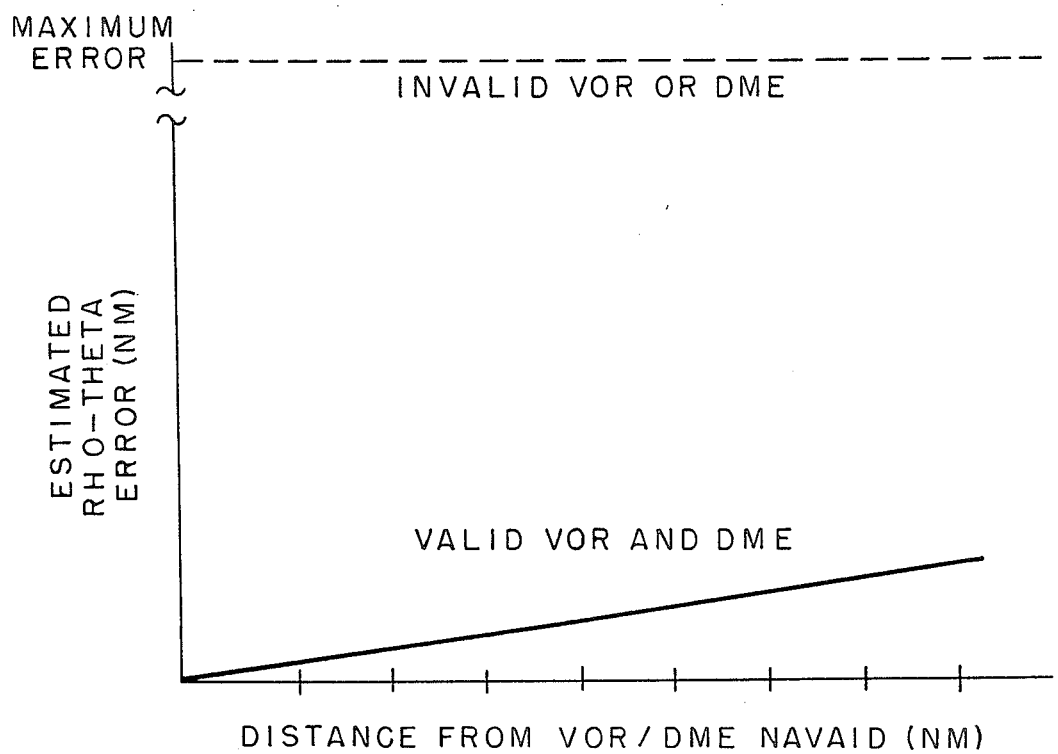
FIG. 3 is a graph of the function utilized to estimate the navmode error for the RHO-THETA navigation mode.

Referring to FIG. 3 with continued reference to FIG. 1, the error estimators 11 and 12 provide the estimated RHO-THETA navmode error for the RHO-THETA LEFT and RHO-THETA RIGHT navmodes respectively. The error function for the estimated RHO-THETA navmode error is provided in FIG. 3. Thus, it is appreciated that the present embodiment supports two RHO-THETA navigation modes, RHO-THETA utilizing the onside VOR and RHO-THETA utilizing the offside VOR. In both modes of navigation, the ARINC 709 scanning DME provides the DME information required to perform the RHO-THETA navigation. The estimated RHO-THETA navmode error provided by the error estimator 11 is a function of the distance of the aircraft to any type of navaid tuned on the left radio. Similarly, the estimated RHO-THETA navmode error provided by the error estimator 12 is a function of the distance of the aircraft to any type of navaid tuned on the right radio.

The error estimators 11 and 12 provide their respective estimated navmode error signals for the RHO-THETA LEFT and RHO-THETA RIGHT navigation modes. The error estimates for RHO-THETA navigation utilizing the onside or offside VOR/DME are generated as follows. If the navigation radio receiver is tuned to a navaid that has a VOR only, or if the receiver is tuned to a VOR/DME navaid, but the VOR and DME are not both valid, the estimated navmode error is set to an arbitrarily large value. Otherwise, the estimated navmode error is computed as follows:

$$\Delta P = \{(\Delta R)^2 + [R(\Delta\theta)]^2\}^{\frac{1}{2}}$$

Where
$\Delta P$ = Position Error (NM)
$R$ = DME ground range (NM)
$\Delta R$ = DME range error (NM)
$\Delta\theta$ = VOR bearing error (RADIANS)
If DME errors are assumed to be negligable, then $$\Delta P = R(\Delta\theta)$$

Where $\Delta\theta = 0.061$ RADIANS or $3.5°$.

The error estimator 12 of FIG. 1 for computing the estimated navmode error for the RHO-THETA offside navmode adds a small positive bias to the estimated navmode error. This assures that if both the onside and offside receivers are tuned to the same navaid, the system will select the onside VOR receiver when performming RHO-THETA navigation. If the VOR receivers are tuned to different VOR stations, the system includes means (not shown) for selecting the closest valid VOR/DME when performing RHO-THETA navigation.

With continued reference to FIG. 1, the error estimator 13 provides the estimated navmode error for the LOCALIZER LEFT navigation mode as a function of meeting minimum requirements for LOCALIZER updating on the left. Similarly, the error estimator 14 provides the estimated navmode error for the LOCALIZER RIGHT navmode as a function of meeting the minimum requirements for LOCALIZER updating on the right. The LOCALIZER navmode provides very accurate navigation during final approach and missed approach procedures. The criteria that must be achieved before LOCALIZER navigation can be performed are very stringent, but when these criteria are met, LOCALIZER navigation can provide navigational accuracy of better than 0.1 NM. The estimated navmode error function for LOCALIZER LEFT navigation or LOCALIZER RIGHT navigation is generated utilizing the following process.

The estimated navmode errors for both onside and offside LOCALIZER navigation are set to an arbitrarily large value and the estimated navmode error for onside LOCALIZER navigation is generated as follows.

If there is a procedure specified LOCALIZER and it is tuned and valid on the instrument landing system (ILS) receiver, and the aircraft position is within 20 NM of the LOCALIZER, and the bearing from the aircraft position to the LOCALIZER is within ten degrees of the LOCALIZER center beam, and the aircraft track is within thirty degrees of the LOCALIZER center beam, and the LOCALIZER deviation is less than 1.25 degrees; then the estimated navmode error for the onside LOCALIZER navmode is set to 0.1 NM. If any of these conditions are not met, the estimated navmode error remains at the arbitrarily large value.

If, after the above LOCALIZER error function is invoked, the estimated navmode error for onside LOCALIZER navigation remains at the maximum value, then the estimated navmode error for offside LOCALIZER navigation is generated utilizing the same function. Otherwise, the estimated navmode error for offside LOCALIZER navigation remains at the maximum value. This procedure ensures that offside LOCALIZER navigation will never be performed when onside LOCALIZER navigation is possible.

Figure 4:
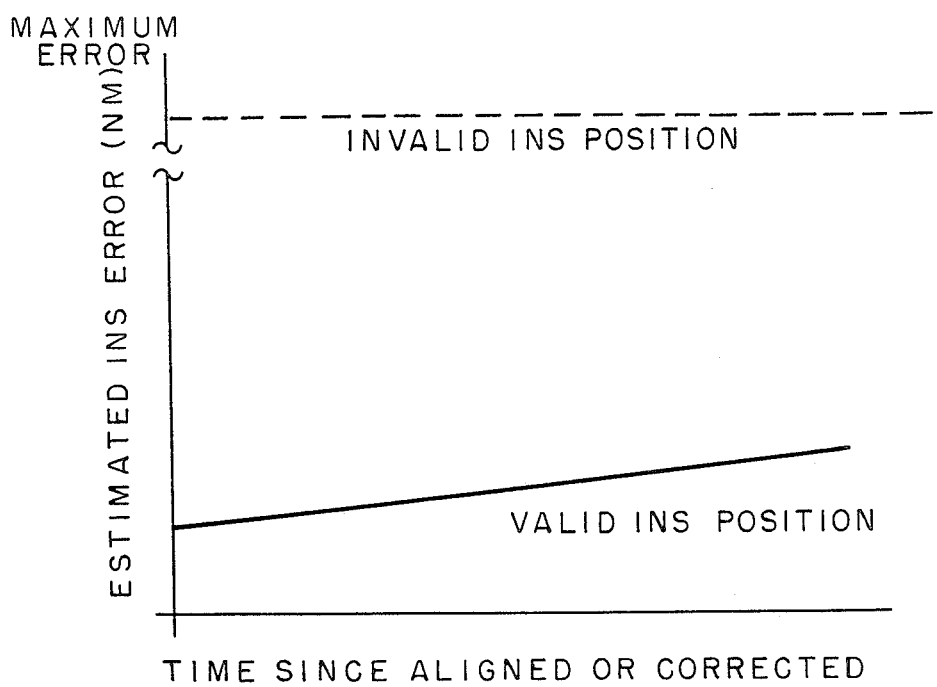
FIG. 4 is a graph of the function utilized to estimate the navmode error for the INS navigation mode.

Referring now to FIG. 4 with continued reference to FIG. 1, the error estimator 15 generates the estimated INS navmode error as a function of the estimated position error signal on the lead 29, the inertial navigation system error, the inertial navigation system drift rate, and the inertial navigation system alignment time. The error function for the estimated INS navmode error (with last known radio or flight crew correction) is illustrated in FIG. 4.

Specifically, the estimated navmode error function for the corrected INS navigation mode is generated in the following manner. When the flight crew (pilot or navigator) aligns the INS, the alignment is assumed to be fairly accurate and the estimated INS navmode error is initialized to an appropriate small value, for example, 0.5 NM. Thereafter, if the estimated position error on the lead 29 is less than the current estimated INS navmode error provided by the error estimator 15, the estimated INS navmode error is set to the estimated position error. If, however, the estimated position error on the lead 29 is not less than the current estimated INS navmode error, the estimated INS navmode error is increased at the drift rate of the INS, for example, 2 NM/HR.

It is appreciated that in accordance with the present invention, the estimated position error on the lead 29 is utilized by the INS error estimator 15 to provide the INS estimated navmode error so that the radio corrected INS will be appropriately selected by the navigation mode selector 17. The excellent short-term characteristics of the INS system are utilized corrected for long-term INS drift. If, however, radio correction to the INS has been washed out, as is done during transit through regions in which no radio navaids are available, then the estimated INS navmode error will be set to:

2 NM + [2 NM/HR × (time in hours since alignment)]

If the navigation system is not equipped with an INS, or if the INS has failed, the estimated INS navmode error is set to an arbitrarily large value.

Figure 5:
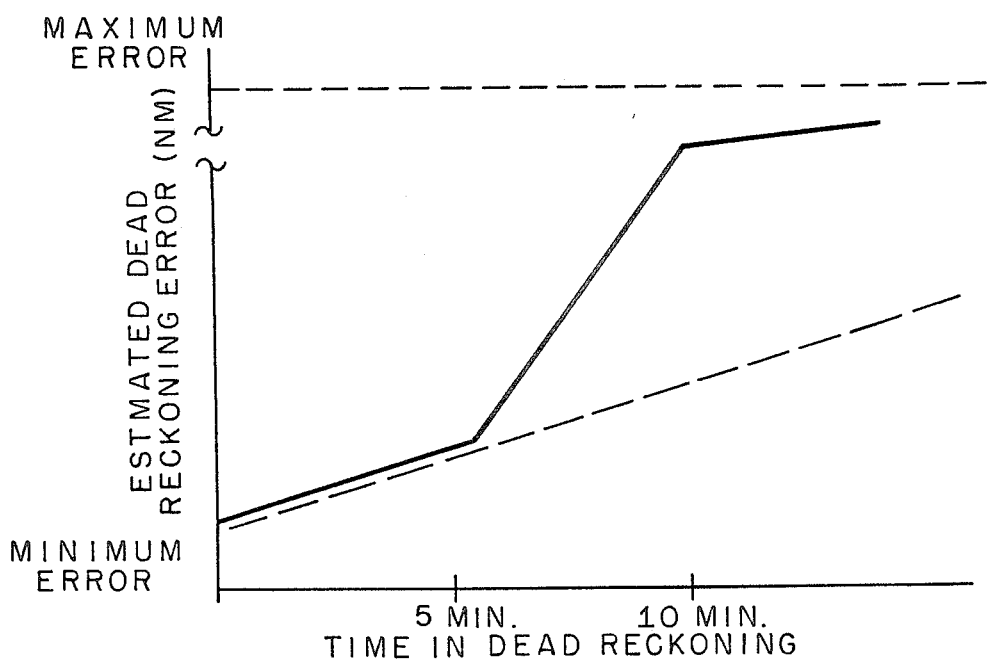
FIG. 5 is a graph of the function utilized to estimate the navmode error for the DEAD RECKONING navigation mode.

Referring now to FIG. 5 with continued reference to FIG. 1, the error estimator 16 provides the estimated DEAD RECKONING navmode error in accordance with a function of the estimated position error on the lead 29, the DEAD RECKONING error, and the DEAD RECKONING drift rate. The error function for the estimated DEAD RECKONING navmode error (from last known position or with last known radio correction) is illustrated in FIG. 5. The estimated navmode error function for DEAD RECKONING is similar to the estimated INS navmode error function described above except that instead of utilizing INS drift rate, a higher "DEAD RECKONING drift rate" is utilized. If the current value of estimated position error on the lead 29 is less than the estimated DEAD RECKONING navmode error, then the estimated DEAD RECKONING navmode error is set to the estimated position error. The DEAD RECKONING estimated navmode error is increased from the previous value at the appropriate DEAD RECKONING drift rate as determined by the curve of FIG. 5. The dashed line curve of FIG. 5 represents the assumption that the estimated navmode error is increased from the previous value at the rate of the expected average difference between the last known winds and the actual winds during the time that the system is in the DEAD RECKONING mode.

Alternatively, the solid line curve of FIG. 5 represents the assumption that the longer the aircraft DEAD RECKONS, the less accurate the wind estimate becomes. Therefore, when the DEAD RECKONING error is small (previous navmode was good and therefore the derived wind estimate is good), the drift rate is low, for example 20 NM/HR. When the DEAD RECKONING error is large (previous navmode was not good and therefore the wind estimate may be questionable or the aircraft has been DEAD RECKONING with an old wind estimate), the drift rate is high, for example 125 NM/HR.

DEAD RECKONING may be considered as an economy INS or, alternatively, an INS can be considered as a very accurate DEAD RECKONING system.

With continued reference to FIG. 1, the navigation mode selector 17 selects the navmode having the minimum estimated navmode error that satisfies any procedure specified requirements. If, for example, the FAA prohibits the use of a particular VOR, the VOR navmodes are not enabled. Specifically, the navigation mode selector 17 tentatively selects the navigation mode having the lowest value of estimated navmode error. If there is a procedure specified navaid for the active leg, and the tentatively selected navigation mode does not utilize the procedure specified navaid, the navigation mode selector 17 attempts to identify a valid navigation mode having the lowest value of estimated navmode error and which satisfies the procedure specified requirements. If such a mode is identified, it is selected. If a navigation mode satisfying the procedure specified requirements cannot be identified, or if there is not a procedure specified navaid for the active leg, then the tentative navigation mode is selected.

It is appreciated from the foregoing, that if an active leg has a procedure specified navaid, radio navigation utilizing the procedure specified will be performed, if possible. It is further appreciated that estimated navmode errors for RHO-THETA navmodes contain an offside bias so that when both left and right radios are tuned to the same navaid, the aircraft will navigate utilizing onside data. It is furthermore appreciated that offside LOCALIZER navigation will not be performed when onside LOCALIZER navigation is possible.

As discussed above, the estimated position error signal on the lead 29 is utilized in the generation of the estimated navmode errors for the DEAD RECKONING and INS navmode error estimators. The estimated position error is also utilized in driving the data reasonableness tests implemented in the block 30. The data reasonableness tests are tightened or expanded in accordance with the confidence in position represented by the estimated position error signal. The data reasonableness tests for DME distance data may be implemented whereby the DME data is validated if:

$$|DIST_{DME} - DIST_{APRX}| < \text{ESTIMATED POSITION ERROR}$$

Where:

DIST$_{DME}$=The actual distance from the DME to the true position as obtained from the input DME data, and DIST$_{APRX}$=The distance from the DME to the navigation system position as provided on the lead 25.

The data validation tests for the VOR data is implemented in the block 30 whereby the VOR data is validated if:

$$|DRG_{VOR}-BRG_{APRX}| < [(ESTIMATED\ POSITION\ ERROR/DIST_{APRX}) \times (180/\pi)]$$

Where:

BRG$_{VOR}$=The magnetic bearing as received from the VOR, and

BRG$_{APRX}$ is the expected bearing from the VOR to the navigation system position as provided on the lead 25.

Generally the estimated position error signal on the lead 29 is a measure of the error in the computed aircraft position at any time. If the position data provided by the VOR or DME is greater than this error, the data is considered invalid and the affected navmodes are disabled. It is appreciated that similar data reasonableness tests may be derived and utilized for other navigation sensors.

As described above, the estimated position error signal on the lead 29 is utilized in providing the estimated navmode errors for the INS and DEAD RECKONING navigation modes as well as in determining the validity threshold in the data reasonableness tests block 30. The estimated position error may also be utilized to set the minimum DME range criteria to assure conversion of the BEELINE navmode. Navigation systems utilizing the RHO-RHO navmode, generally have a minimum leg length requirement that could be made less restrictive if it were a function of estimated position error. The estimated position error signal may also be utilized in installations having dual navigation systems for system-to-system position comparisons. Additionally, the estimated position error may be displayed to the pilot or navigator as a measure of navigation system performance.

With continued reference to FIG. 1, the aircraft position computation block 19 provides computed aircraft position in response to appropriate navigation sensor data and information from the navigation data base. Although it is a not shown for simplicity, the aircraft position computation block 19 is responsive to VOR data from the left and right VOR receivers, DME data from the left and right DME receivers, LOCALIZER data from the left and right LOCALIZER receivers and INS data from the INS system.

The position computation blocks 20-24 utilize conventional procedures for providing computed aircraft position, numerous suitable procedures being available in the art for use in the present invention. For example, a MULTIRHORHO procedure for use in block 20 may be implemented as follows. The ARINC 709 DME equipment provides 10 possible navaid pair permutations and the MULTIRHORHO procedure selects two DME navaids. When more than one navaid pair is usable, a different pair is selected every time MULTIRHORHO is executed. MULTIRHORHO defaults to RHO-RHO navigation with one navaid pair.

Figure 6:
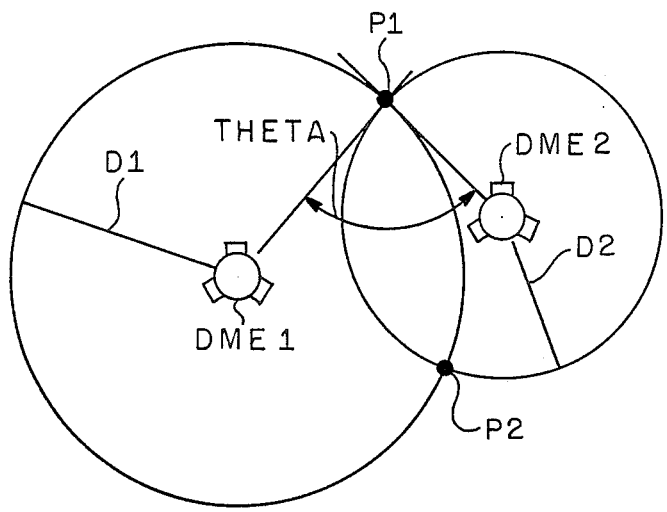
FIG. 6 is a diagram illustrating the position computation for the RHO-RHO navigation mode.

A RHO-RHO navigation procedure is diagrammed in FIG. 6. Given two DME facilities, with known locations, elevations, slant range from each of the facilities to the aircraft and the aircraft altitude, aircraft position is determined as follows. Slant range, station elevation and aircraft altitude are utilized to compute ground ranges D1 and D2. The two DME facilities and their associated ground ranges determine two circles that intersect at points P1 and P2. The aircraft position is either at P1 or P2. The ambiguity is resolved by comparing the bearing from DME1 to P1 with the bearing from DME1 to the last estimate of aircraft position. If the difference between these bearings is less than 30 degrees, P1 is assumed to be the actual aircraft position, otherwise, P2 is assumed to be the actual aircraft position. The angle THETA is restricted to be in the range 30 to 150 degrees. With this restriction, the procedure provides the correct position provided that D1 and D2 are both greater than 1.94 times the difference between the estimated position and actual aircraft position.

Figure 7:
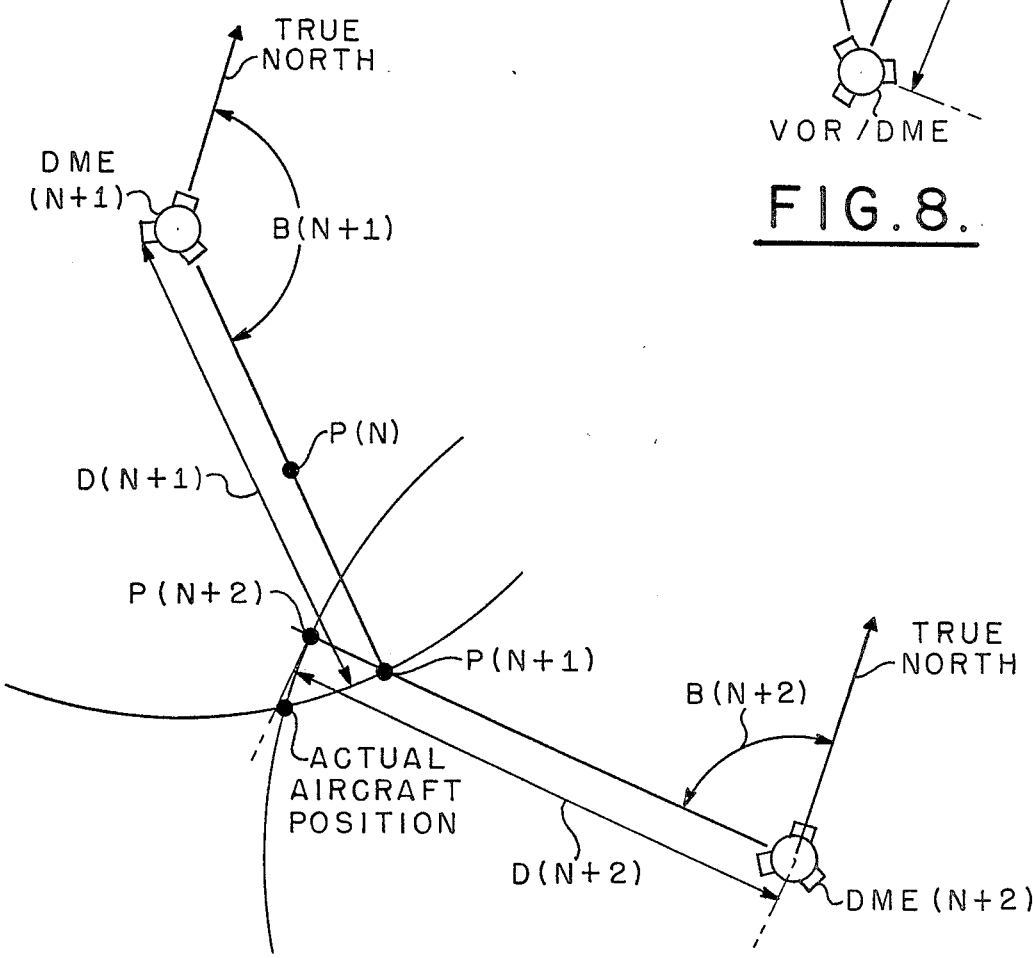
FIG. 7 is a diagram illustrating the position computation for the BEELINE navigation mode.

In a manner well appreciated in the art, BEELINE navigation may be utilized instead of MULTIRHORHO or RHO-RHO navigation. Referring to FIG. 7, several iterations of the BEELINE procedure is illustrated. It is appreciated that on each successive iteration, the computed aircraft position becomes closer to the actual aircraft position. Given a DME distance to each of two or more DME ground stations, each having a known location and an initial position estimate P(N), position updates are generated by the BEELINE procedure as follows:

1. Generate the bearing B(N+1) from DME(N+1) to the initial position estimate P(N).
2. Obtain D(N+1) from the DME data. D(N+1) is the true distance from DME(N+1) to the actual aircraft position.
3. Utilize the bearing B(N+1) and the distance D(N+1) in a direct Sodano's geodesic equation to compute P(N+1), which is a new estimate of aircraft position.
4. Repeat steps 1-3 utilizing a different DME station.

Figure 8:
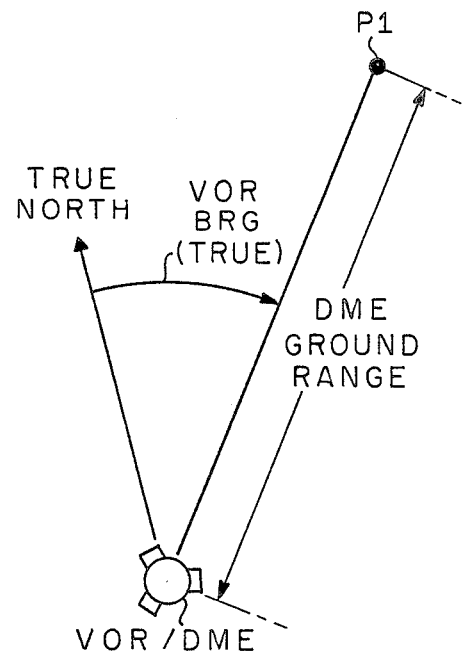
FIG. 8 is a diagram illustrating the position computation for the RHO-THETA navigation mode.

Referring now to FIG. 8, a RHO-THETA navigation procedure is illustrated. Given the co-located DME and VOR facility of known position and elevation, the VOR bearing, the DME slant range and the altitude of the aircraft, the aircraft position is computed as follows. The DME slant range is converted to ground range and the magnetic variation for the VOR location is added to the VOR bearing to convert the VOR bearing to a true bearing. The computed aircraft position P1 is then generated utilizing Sodano's geodesic equations.

Figure 9:
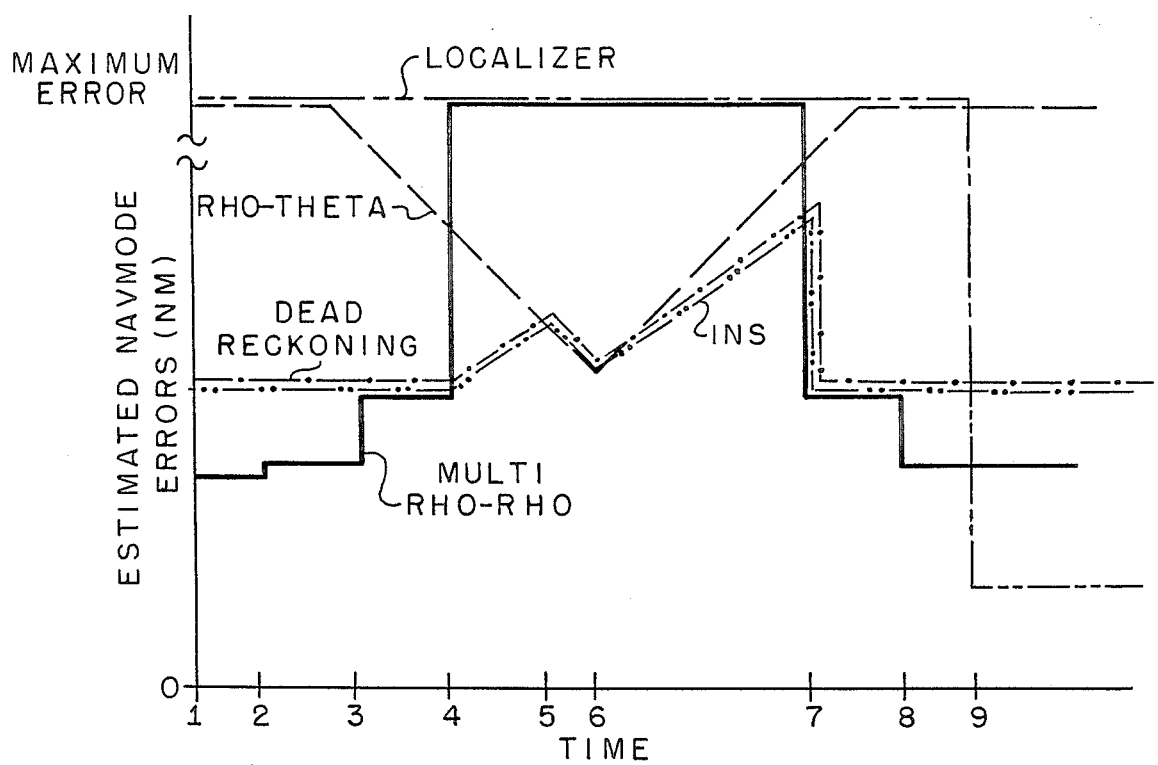
FIG. 9 is a graph of the estimated navmode error versus time for each of a plurality of navigation modes in accordance with an illustrative scenario.
Figure 10:
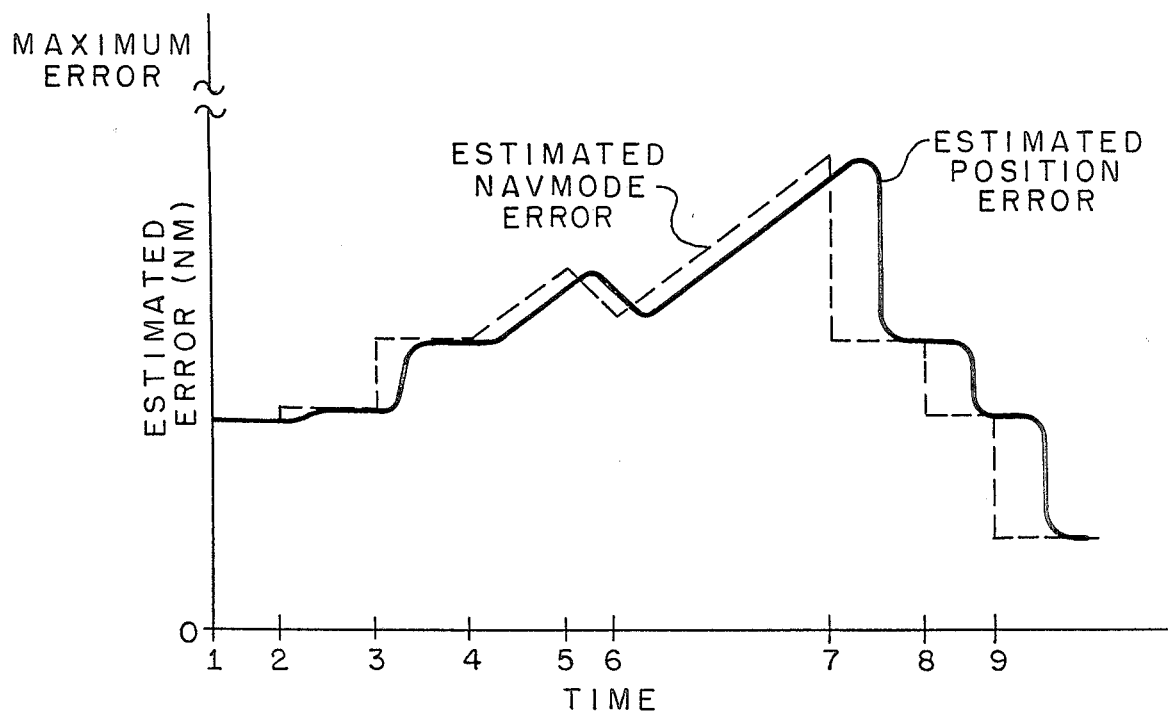
FIG. 10 is a graph of the estimated navmode error for the selected mode versus time, and estimated position error versus time corresponding to the scenario depicted in FIG. 9.

In operation of the navigation system disclosed herein, an illustrative flight scenario will be described. Referring to FIGS. 9 and 10, the estimated navmode error and the estimated position error for the flight plan is illustrated. It is appreciated that the flight plan is not "typical", but rather an example constructed to illustrate transitions between the navigation modes supported by the embodiment described above. During a typical commercial service flight, it is expected that the selected navmode will be MULTIRHORHO or BEELINE over most of the flight with occasional reversions to INS (or DEAD RECKONING for non-INS equipped aircraft).

The estimated navmode error diagram of FIG. 9 and the estimated position error diagram of FIG. 10 illustrate the flight scenario wherein various navigation modes and sensor combinations are selected. FIG. 9 illustrates the estimated navmode errors for each navmode combination. FIG. 10 illustrates the estimated navmode error (n dashed line) for the selected navmode combination and further illustrates the resulting estimated position error in solid line. The following ordered list of selected navigation modes correspond to the indicated points on the time axis of FIGS. 9 and 10.

1. MULTIRHORHO NAVMODE (FIVE VALID DME NAVAIDS)
2. MULTIRHORHO NAVMODE (FOUR VALID DME NAVAIDS)
3. MULTIRHORHO NAVMODE (TWO VALID DME NAVAIDS)
4. INS NAVMODE
5. RHO-THETA LEFT NAVMODE
6. INS NAVMODE
7. MULTIRHORHO NAVMODE (TWO VALID DME NAVAIDS)
8. MULTIRHORHO NAVMODE (FOUR VALID DME NAVAIDS)
9. LOCALIZER RIGHT NAVMODE

It is appreciated that the BEELINE navmode could be utilized instead of the MULTIRHORHO navmode.

It is appreciated from the foregoing that the present invention provides a multiple-mode, multiple-sensor navigation system with navigation mode selection determined by minimizing position error. The error characteristics of the various navigation modes supported by the system are well known. For each navigation mode supported by the system, an estimate of expected position error is generated in real time as a function of sensor data. Any navigation mode can be added to the system provided that a suitable error model therefor is available or can be developed. The system of the present invention, in dynamic operation, avoids frequent navigation mode switching when such switching would cause the aircraft to maneuver. The present invention estimates the navigation errors that would be introduced by each available navigation mode, and then selects the navigation mode with the lowest estimated error.

The navigation system, in accordance with the present invention, provides navigation that is superior to that presently in use in prior art systems. The data reasonableness tests of block 30 of FIG. 1, which are predicated on the allowable difference between expected sensor data and actual sensor data, are a function of expected position error, thereby providing the navigation system with an enhanced capability to reject inaccurate navaid sensor data. The data reasonableness test limits are maintained as tight as possible by adjusting the limits in accordance with functions of estimated position error. The present invention provides the capability of utilizing the excellent short-term accuracy of INS and/or DEAD RECKONING navigation thereby avoiding less accurate navigation modes.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. A navigation mode selection apparatus for utilization in a navigation system of the type having a plurality of navigation modes, each mode providing a position signal generated by a respective one of a plurality of navigation mode position determining procedures, comprising:
   error estimator means for providing mode error signals representative of position error estimates for each of said plurality of navigation modes; and
   navigation mode selector means responsive to said mode error signals for selecting from said plurality of navigation modes one navigation mode having a mode error signal representative of a position error estimate which is less than position error estimates represented by mode error signals from other navigation modes of said plurality of navigation modes and for providing said mode error signal of said one navigation mode;
   low pass position filter means having a predetermined time constant and coupled to receive said position signal for providing said position signal with a slow-in function, thereby eliminating abrupt position signal changes when switching between navigation modes;
   low pass position error filter means having a time constant equal to said predetermined time constant and coupled to receive said mode error signals of said one navigation mode from said navigation mode selector means for providing a position error signal representative of estimated position error to said one navigation mode; and
   validation means coupled to said low pass position filter means and said low pass position error filter means for validating input navigation data presented by said one navigation mode by comparing said position signal to a threshold set in accordance with said position error signal, whereby an unfavorable comparison of said position signal to said threshold causes said navigation mode selector means to select a navigation mode other than said one navigation mode.

2. The apparatus of claim 1 wherein said navigation mode selector means comprises means responsive to criteria signals representative of a predetermined procedure specified criteria for selecting said one navigation mode consistent with criteria represented by said criteria signals.

3. The apparatus of claim 1 in which said validation means comprises means for determining a difference between said position signal and said position error signal and for comparing said difference to said threshold.

4. The apparatus of claim 2 wherein:
   said plurality of navigation modes includes an INS navigation mode associated with an inertial navigation system,
   said error estimator means includes an INS error estimator for providing an estimated INS navigation mode error signal,
   said INS error estimator being responsive to said position error signal for providing said estimated INS navigation mode error signal as a function thereof, and said INS navigation mode includes means for correcting said position signal generated by said INS navigation mode in accordance with said estimated INS navigation mode error signal.

5. The apparatus of claim 2 in which
   said plurality of navigation modes includes a DEAD RECKONING navigation mode associated with a DEAD RECKONING procedure apparatus in said navigation system, said error estimator means includes a DEAD RECKONING error estimator for providing an estimated DEAD RECKONING navigation mode error signal, said DEAD RECKONING error estimator being responsive to said estimated position error signal for providing said estimated DEAD RECKONING navigation mode error signal as a function thereof, and said DEAD RECKONING navigation mode includes means for correcting said position signal generated thereby in accordance with said estimated DEAD RECKONING navigation mode error signal.

* * * * *